(12) United States Patent
Arinaga

(10) Patent No.: US 7,804,183 B2
(45) Date of Patent: Sep. 28, 2010

(54) POWER GENERATING SYSTEM

(75) Inventor: Shinji Arinaga, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 413 days.

(21) Appl. No.: 11/884,373

(22) PCT Filed: Feb. 16, 2006

(86) PCT No.: PCT/JP2006/302707

§ 371 (c)(1),
(2), (4) Date: Aug. 15, 2007

(87) PCT Pub. No.: WO2006/088078

PCT Pub. Date: Aug. 24, 2006

(65) Prior Publication Data

US 2009/0146423 A1    Jun. 11, 2009

(30) Foreign Application Priority Data

Feb. 17, 2005    (JP)    ............................. 2005-041012

(51) Int. Cl.
*F03D 9/00* (2006.01)
(52) U.S. Cl. ...................................................... 290/44
(58) Field of Classification Search ............... 290/44
See application file for complete search history.

(56) References Cited

U.S. PATENT DOCUMENTS 6,239,506 B1    5/2001 Roskey
6,479,907 B1 *    11/2002 Eriksson et al. ............... 290/44
6,670,721 B2 *    12/2003 Lof et al. ....................... 290/44
6,724,097 B1    4/2004 Wobben
6,998,729 B1 *    2/2006 Wobben ....................... 290/54
7,042,110 B2 *    5/2006 Mikhail et al. ................. 290/44
2001/0015557 A1    8/2001 Roskey

FOREIGN PATENT DOCUMENTS

| JP | 6-169598 A | 6/1994 |
| JP | 2000-202441 A | 7/2000 |
| JP | 2001-234845 | 8/2001 |
| JP | 2001-292531 | 10/2001 |
| JP | 3352662 B2 | 12/2002 |
| JP | 2003-079057 | 3/2003 |
| JP | 2003-343416 A | 12/2003 |

OTHER PUBLICATIONS

International Search Report Apr. 28, 2006.
Japanese Office Action issued on Aug. 26, 2008.

* cited by examiner

*Primary Examiner*—T C Patel
(74) *Attorney, Agent, or Firm*—Kanesaka Berner & Partners LLP

(57) ABSTRACT

Provided is a power generator, including a plurality of wind power generators generating electrical power using wind power energy, and variable-speed wind power generators (20a, 20b) connected between the power generator and an electrical power system. The variable-speed wind power generators (20a, 20b) equalize an output of the entire power generating system by outputting power for correcting for a drop in output of the power generator.

3 Claims, 3 Drawing Sheets

POWER GENERATING SYSTEM

CROSS REFERENCE TO RELATED APPLICATIONS

The present Application is based on International Application No. PCT/JP2006/302707, filed Feb. 16, 2006 which in turn corresponds to Japan Application No. 2005-041012, filed Feb. 17, 2005 and priority is hereby claimed under 35 USC §119 based on these applications. Each of these applications are hereby incorporated by reference in their entirety into the present application.

TECHNICAL FIELD

The present invention relates to power generating systems combining power generators that generate electrical power using natural energy and variable-speed wind power generators, and more particularly, relates to a power generating system outputting equalized electrical power by virtue of a variable-speed wind power generator outputting power for correcting a drop in output of the power generator.

BACKGROUND ART

In a power generator such as a wind power generator or a solar power generator using natural energy, since the output is highly influenced by weather conditions, it is difficult to generate power according to demand. In addition, because system voltages or frequencies vary depending on output fluctuations, the level of deployment is limited due to system operating restrictions.

In order to overcome these problems, recently, as described in Publication of Japanese Patent No. 3352662 (Patent Document 1) and so forth, there has been progress in the development of a hybrid-type distributed power supply system that realizes high-quality and stable power supply by combining a power generator using natural energy with an electrical power storage device such as a secondary battery, and by controlling the output fluctuation of the power generator using the electrical power storage device.

Patent Document 1: Publication of Japanese Patent No. 3352662 (pages 2-7, FIG. 1)

DISCLOSURE OF INVENTION

However, since the electrical power storage device mentioned above is expensive, it is less feasible in terms of cost effectiveness, thus making its further deployment difficult.

The present invention has been conceived to solve the above-described problems, and an object thereof is to provide a power generating system capable of realizing high-quality and stable power supply, without using expensive equipment such as an electrical power storage device.

In order to solve the above problems, the present invention employs the following solutions.

A first aspect of the present invention provides a power generating system including at least one power generator generating electrical power using natural energy; and at least one variable-speed wind power generator for outputting power to correct for a drop in output of the power generator.

According to this configuration, because at least one variable-speed wind power generator is provided and this variable-speed wind power generator outputs power to correct for the drop in output of the power generator, it is possible to equalize the output of the power generating system.

The power generator may be, for example, a wind power generator, a solar power generator, and so on. The wind power generator serving as the power generator may be, for example, a fixed-speed wind power generator, a variable-speed wind power generator, or a combination thereof.

Since the variable-speed wind power generator is relatively low-cost compared to a conventional electrical power storage device, it is possible to realize equalization of the output of the power generating system, for example, the output power, at low cost.

In the power generating system, a priority order may be stored in advance in the variable-speed wind power generator, and power outputting for correcting for the drop in output of the power generator may be performed in order from the variable-speed wind power generator having the highest priority order.

According to this configuration, because a priority order is stored in advance in the variable-speed wind power generator, and an output control for correcting for the drop in output of the power generator is realized in order from the variable-speed wind power generator having the highest priority order, when, for example, correction for the drop in output of the power generator is sufficiently performed by the variable-speed wind power generator having the highest priority, the variable-speed wind power generator having the priority lower than that performs normal electrical power generation. As a result, it is possible to reduce the number of variable-speed wind power generators performing output control designed to correct for the drop in output, thus allowing efficient output equalization of the power generating system to be achieved.

In the power generating system, the priority order may be assigned to be higher for the variable-speed wind power generator installed in a location with more stable wind conditions.

According to this configuration, because the priority order is assigned to be higher for the variable-speed wind power generator installed in a location with more stable wind conditions, in other words, for the variable-speed wind power generator having more stable output, it is possible to efficiently control the correction for the drop in output of the power generator using fewer variable-speed wind power generators.

In the above-described power generating system, the priority order may be changeable according to weather conditions.

Since the output stability of the variable-speed wind power generator varies depending on various weather conditions such as the season or the wind direction, by changing the priority order according to these weather conditions, output control designed to correct for the drop in output of the power generator is always realized in order from the variable-speed wind power generator having more stable output. Accordingly, it is possible to realize efficient equalization of the power generating system using fewer variable-speed wind power generators.

In the power generating system, the number of variable-speed wind power generators may be determined according to an estimated maximum value of an output fluctuation of the power generator.

Since the variable-speed wind power generators are required to perform output which can correct for the drop in output of the power generator, the number of variable-speed wind power generators must be determined so that the total output from the variable-speed wind power generators exceeds the output that is required to equalize the estimated maximum value of the output fluctuation. In other words, the number of variable-speed wind power generators is also determined based on an estimated average output from the variable-speed wind power generator.

A second aspect of the present invention provides a variable-speed wind power generator which is connected between a power generator generating electrical power using natural energy and an electrical power system supplied with electrical power from the power generator, and which supplies electrical power to the electrical power system so as to correct for a drop in output of the power generator.

The power generating system and the variable-speed wind power generator according to the present invention provides an advantage in that it is possible to realize high-quality and stable power supply without using expensive equipment such as an electrical power storage device.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF DRAWINGS

Other characteristics and advantages of the invention will become apparent with the aid of the description which follows in conjunction with the appended drawings which represent.

BEST MODE FOR CARRYING OUT THE INVENTION

Embodiments of a power generating system according to the present invention will now be described below with reference to the drawings.

Figure 1:
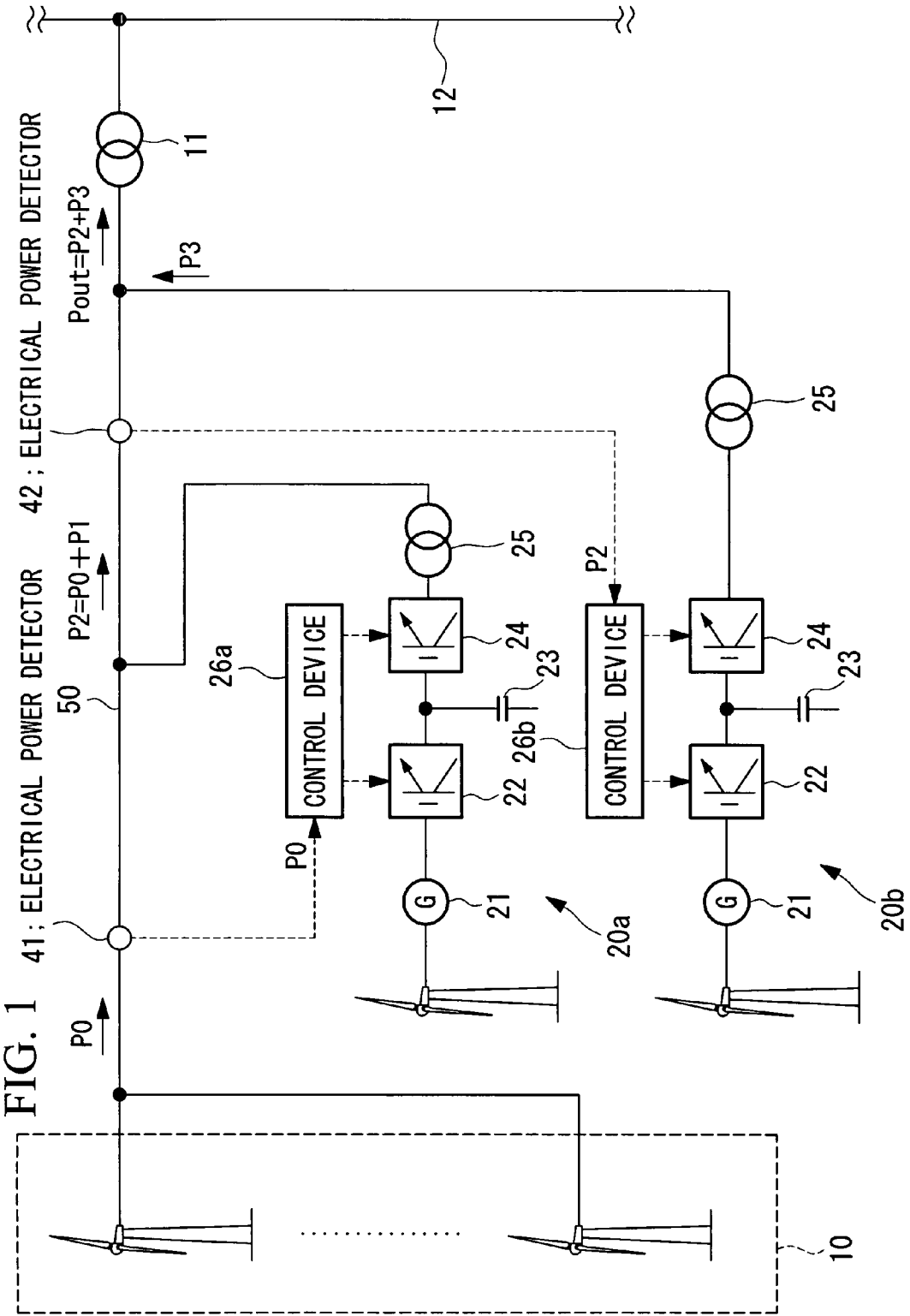
FIG. 1 is a diagram showing, in outline, the configuration of a power generating system according to a first embodiment of the present invention.

FIG. 1 is a block diagram showing, in outline, the configuration of a power generating system according to a first embodiment of the present invention.

As shown in FIG. 1, the power generating system according to this embodiment includes a power generator 10 having a plurality of wind power generators that generate electrical power using natural energy. In this case, each of the wind power generators included in the power generator 10 may be fixed-speed wind power generators, variable-speed wind power generators, or a combination thereof.

The power generator 10 is connected to an electrical power system 12 via an electrical power converter 11. A plurality of variable-speed wind power generators 20a and 20b are connected between the power generator 10 and the electrical power converter 11. These variable-speed wind power generators 20a and 20b output power to correct for a drop in the output of the power generator 10 (for example, a drop in output power). The number thereof is determined, for example, according to an estimated maximum value of an output fluctuation of the power generator 10.

More specifically, as the estimated maximum value of the output fluctuation of the power generator 10 becomes larger, the number thereof increases. This is because, the larger the output fluctuation, the greater the electrical power needed for correcting for the drop in the output thereof, thus requiring variable-speed wind power generators to supply most of the electrical power thereof. In addition, the number thereof is determined according to the average power generation level of the variable-speed wind power generators. According to this embodiment, an example is given in which two variable-speed wind power generators are used.

In this embodiment, the variable-speed wind power generator 20a is connected between the power generator 10 and the electrical power converter 11, and the variable-speed wind power generator 20b is connected between the variable-speed wind power generator 20a and the electrical power converter 11. Thus, the variable-speed wind power generator 20a is disposed at the upstream side of electrical current, when viewed from the variable-speed wind power generator 20b.

According to this embodiment, the variable-speed wind power generator 20a is provided for outputting power to correct for the drop in an output P0 from the power generator 10. In addition, the variable-speed wind power generator 20b is provided for further correcting for the drop in a total output P2 of the output P0 from the power generator 10 and an output P1 from the variable-speed wind power generator 20a.

The variable-speed wind power generators 20a and 20b are, for example, variable-speed wind power generators with an AC-DC-AC link system, and each includes a generator 21 that is connected to a rotor of a windmill; an active rectifier 22 for converting three-phase AC power output from the generator 21 to DC power and outputting it; a DC link 23 for smoothing the DC power output from the active rectifier 22; an inverter 24 for converting the DC power output from the DC link 23 to three-phase AC power and outputting it; and an electrical power converter 25 for supplying the output of the inverter 24 to the electrical power system 12.

The variable-speed wind power generator 20a also includes a control device 26a for controlling the output based on the output power P0 from the power generator 10.

In addition, the variable-speed wind power generator 20b includes a control device 26b for controlling the output based on the total output power P2 of the power generator 10 and the variable-speed wind power generator 20a.

On an electrical power line 50 connecting the power generator 10 and the electrical power system 12 described above, an electrical power detector 41 is provided between the power generator 10 and the variable-speed wind power generator 20a for detecting the output power P0 from the power generator 10. In addition, on the electrical power line 50 connecting the power generator 10 and the electrical power system 12 described above, an electrical power detector 42 is provided between the variable-speed wind power generator 20a and the variable-speed wind power generator 20b for detecting the total output power P2 of the output power P0 from the power generator 10 and the output power P1 from the variable-speed wind power generator 20a.

The output power P0 detected by the electrical power detector 41 is input to the control device 26a of the variable-speed wind power generator 20a. The output power P2 detected by the electrical power detector 42 is input to the control device 26b of the variable-speed wind power generator 20b.

Next, the operation of the power generating system, having the above configuration, will be described.

First, each wind power generator provided in the power generator 10 generates electrical power by receiving wind, and the generated electrical power is output from the power generator 10. The output power P0 from the power generator 10 is detected by the electrical power detector 41 provided on the electrical power line 50. This detection result is input to the control device 26a of the variable-speed wind power generator 20a.

The control device 26a calculates a target correcting output power P1' (including both active power and reactive power) for making the output power P0 approach a target output power P2 obtained by smoothing this output power P0 and controls the active rectifier 22 and the inverter 24 so as to make the output power P1 of the variable-speed wind power generator 20a follow this target correction output power P2. Here, the above-described target output power P1' can be set as desired. For example, it is possible to use an output value obtained by inputting the output power P0 into a first-order delay compensating circuit or the like, or a value obtained by multiplying the maximum generated electrical power of the power generator 10 by a predetermined ratio (for example, 95%).

In addition, for example, when the active rectifier 22 and the inverter 24 are constituted by a plurality of switching devices, by performing PWM control of these switching devices, the control device 26a makes the output power P1 of the variable-speed wind power generator 20a follow the target correcting output power P1'.

Figure 2:
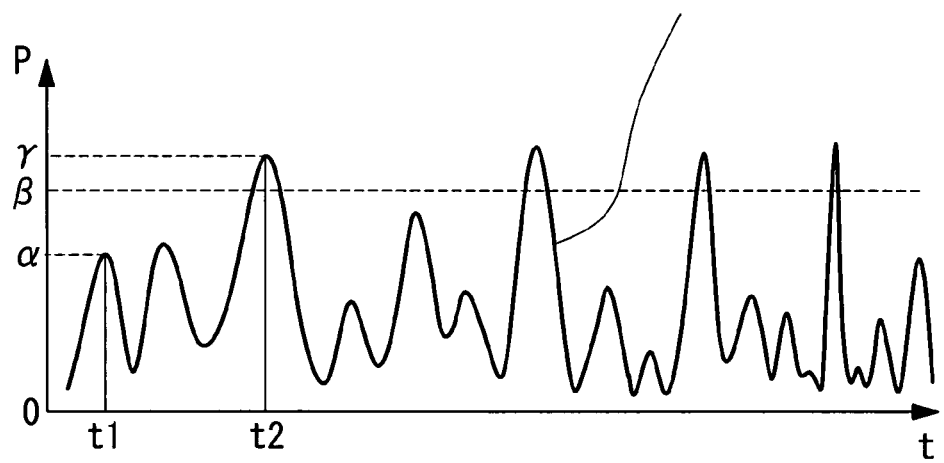
FIG. 2 is a waveform diagram for explaining the operation of a variable-speed wind power generator according to the first embodiment of the present invention.

Specifically, as shown at time t1 in FIG. 2, when the target correcting output power P1' is α, and the output power from the generator 21 of the variable-speed wind power generator 20a is β (α<β), the control device 26a drops the output power β from the generator 21 to α and outputs it. On the other hand, as shown at time t2 in FIG. 2, when the target correcting output power P1' is γ, and the output power from the generator 21 of the variable-speed wind power generator 20a is β (γ>β), the output power β from the generator 21 is output unchanged.

As described above, by controlling the output power from the variable-speed wind power generator 20a, the drop in electrical power of the output power P0 from the power generator 10 is corrected within the power generating range of the generator 21 of the variable-speed wind power generator 20a.

The output power, that is corrected for the drop in output in this way, in other words, the total output power P2 of the output power P0 from the power generator 10 and the output power P1 from the variable-speed wind power generator 20a, is detected by the electrical power detector 42. This detection result is then input to the control device 26b of the variable-speed wind power generator 20b.

The control device 26b calculates a target correcting output power P3' for making the output power P2 approach a target output power Pout obtained by correcting for the drop in output of the output power P2 and controls the active rectifier 22 and the inverter 24 so as to make an output power P3 of variable-speed wind power generator 20b follow this target correcting output power P3'. For example, when the active rectifier 22 and the inverter 24 are constituted of a plurality of switching devices, by performing PWM control of these switching devices, the output power of the variable-speed wind power generator 20b is made to follow by the target correcting output power P3'.

As a result, in FIG. 2, when the variable-speed wind power generator 20a does not correct for the drop in output sufficiently (for example, the time t2 in FIG. 2), the electrical power deficit (for example, γ-β) is supplied by the variable-speed wind power generator 20b.

By doing so, the output power P0 from the power generator is corrected by an amount equal to the drop in output by the variable-speed wind power generators 20a and 20b. Thus, a equalized output power Pout is supplied to the electrical power system 12 via the electrical power converter 11.

As described above, with the power generating system according to this embodiment, since the relatively low-cost variable-speed wind power generators 20a and 20b correct for the drop in the output power of the power generator 10, it is possible to supply high-quality and stable electrical power at low cost to the electrical power system 12, without using an expensive electrical power storage device and so forth.

As shown in FIG. 2, in the power generating system described above, when the variable-speed wind power generator 20a is capable of substantially correcting for the drop in output of the power generator 10, the output correction can be realized in the following way.

First, the plurality of variable-speed wind power generators 20a and 20b provided for correcting for the drop in output are divided into the variable-speed wind power generator 20a for mainly correcting for the drop in output, and the auxiliary variable-speed wind power generator 20b for assisting the variable-speed wind power generator 20a.

The auxiliary variable-speed wind power generator 20b basically performs normal operation by reducing the output power. In other words, instead of normal operation where the output power generated by the generator 21 of the variable-speed wind power generator 20b is directly electrically converted and supplied, the output power generated by the generator 21 is subjected to a partial load operation by a certain amount (for example, 70%), and the partial-load output power is output to the electrical power line 50.

Figure 3:
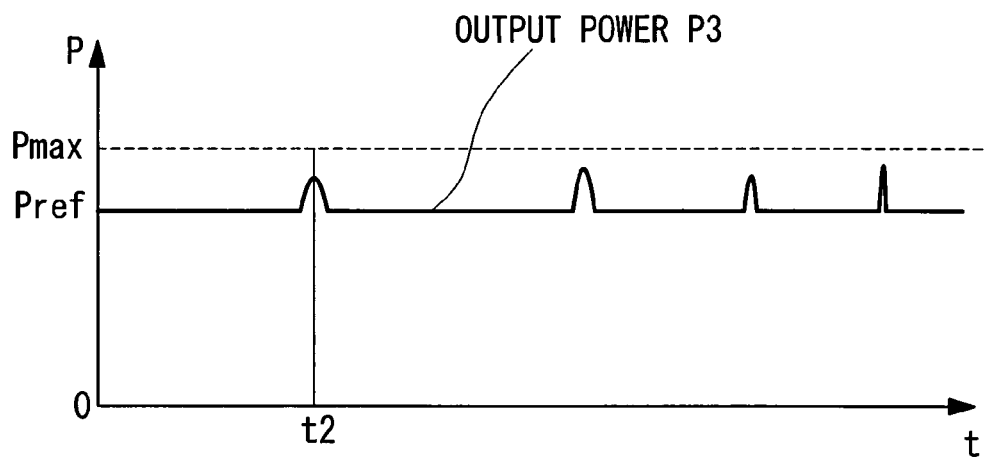
FIG. 3 is a waveform diagram for explaining the operation of the variable-speed wind power generator according to the first embodiment of the present invention.

For example, as shown in FIG. 3, when Pmax is defined as an electrical power value in a case where the output power of the generator 21 is output without being subjected to the partial load operation, Pref, obtained by subjecting this output power Pmax to the partial load operation with a predetermined ratio, is defined as the output power P3 in normal operation. Then, as shown at time t2 and so forth in FIG. 2, when equalization of the power generator 10 cannot be sufficiently achieved due to the insufficient output power from the variable-speed wind power generator 20a, control is performed so as to output an electrical power deficit obtained by further adding this output power to the normal output power P3. Accordingly, it is possible to perform electrical power generation even in the variable-speed wind power generators provided for correcting for the drop in output power of the power generator, and it is thus possible to supply a larger amount of stable electrical power to the electrical power system 12 as the output of the power generating system.

In the above-described embodiment, when the generated electrical power P0 from the power generator 10 considerably exceeds the target output power P0', by employing partial-load outputting in the variable-speed wind power generator 20a by an amount of electrical power equal to the excess output power, it is possible to make the total output P2 of the power generator 10 and the variable-speed wind power generator 20a approach the target output power P0'.

Figure 4:
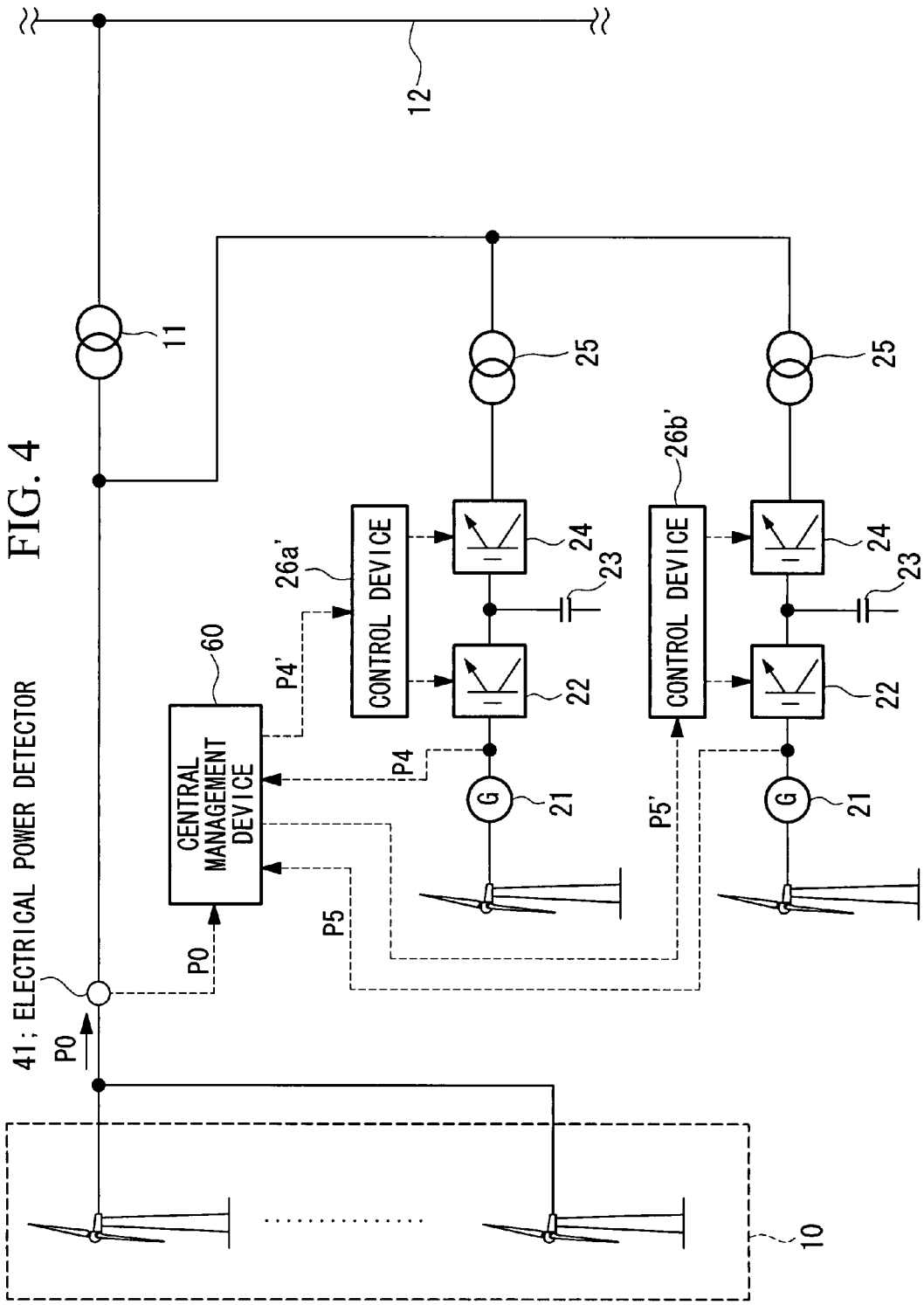
FIG. 4 is a diagram showing, in outline, the configuration of a power generating system according to a second embodiment of the present invention.

Next, a second embodiment of the present invention will be described with reference to FIG. 4.

A power generating system of this embodiment differs from the power generating system according to the first embodiment in that a central management device 60 is provided for centrally controlling each of the variable-speed wind power generators 20a and 20b, and each variable-speed wind power generator 20a and 20b controls the output based on commands from the central management device 60.

In the power generating system of this embodiment, a description of the features common to the first embodiment is omitted, and only differences from the first embodiment will be described below.

The output power P0 from the power generator 10 is input to the central management device 60 from the electrical power detector 41, and output powers P4 and P5 from the generators 21 provided in the variable-speed wind power generators 20a and 20b are input to the central management device 60.

The central management device 60 calculates a target output power for correcting for the drop in output of the output power P0 from the power generator 10. Based on this target output power and the output powers P4 and P5 from the generators 21 of the variable-speed wind power generators 20a and 20b, the central management device 60 determines individual target output powers P4' and P5' of the variable-speed wind power generators 20a and 20b, respectively.

Specifically, a priority order of the variable-speed wind power generators 20a and 20b is set in advance in the central management device 60, and the individual target output powers are determined in order from the higher priority. At this time, when the variable-speed wind power generator having the highest priority is capable of outputting the target output power, the target output power is output to the highest priority variable-speed wind power generator as the individual target output power, and a command for normal operation is issued to the variable-speed wind power generator having the priority lower than that.

When the individual target output powers P4' and P5' are input to the control devices 26a and 26b of each variable-speed wind power generator 20a and 20b from the central management device 60 in this way, the control devices 26a and 26b control the active rectifiers 22 and the inverters 24 so as to make their output powers follow these individual target output powers P4' and P5'. Accordingly, the target output power is output as the total output power of the variable-speed wind power generators 20a and 20b.

As a result, the drop in output of the power generator 10 is corrected, and equalized stable output power is supplied to the electrical power system 12 via the electrical power converter 11 as the output of the power generating system.

In the power generating system according to the second embodiment described above, the priority order is preferably assigned to be higher for the variable-speed wind power generator installed at a location with more stable wind conditions, in other words, the variable-speed wind power generator having more stable output. By assigning priority in this way, it is possible to equalize the output of the power generating system efficiently using fewer variable-speed wind power generators.

The above priority order can also be changed according to weather conditions.

The output stability of the variable-speed wind power generators 20a and 20b varies depending on various weather conditions such as the season or the wind direction. Therefore, by changing the priority order according to these weather conditions, outputs designed to equalize the output from the power generator are always realized in order from the variable-speed wind power generator having more stable output. Accordingly, it is possible to correct for the drop in output of the power generator using fewer variable-speed wind power generators, thus allowing effective equalization of the output.

Although preferred embodiments of the present invention have been described above with reference to the drawings, the actual configuration is not particularly limited to these embodiments. Various modifications are possible so long as they do not depart from the spirit of the present invention.

First, in the above-described embodiment, the power generator 10 is constituted of wind power generators, but this is just an example; it may be constituted, for example, of a power generator that generates electrical power using natural energy, such as a solar power generator.

Second, the control devices 26a and 26b and the central management device 60 may be formed of an analog circuit having a function for realizing the above control, or may include a computer system such as that described below.

The control device 26a or the like is constituted, for example, of a computer system including, a CPU (central processing unit), a ROM (Read Only Memory), a RAM (Random Access Memory), and so on (not shown in the drawings). A sequence of processing steps for implementing the various functions described above is stored in the ROM or the like, and the CPU reads out the program into the RAM or the like to execute information processing or calculations, thus realizing the above output control and so forth.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A power generating system comprising:
    at least one power generator generating electrical power using natural energy; and
    at least one variable-speed wind power generator for outputting power to correct for a drop in output of the power generator;
    wherein a priority order is stored in advance in the variable-speed wind power generator, and power outputting for correcting for the drop in output of the power generator is performed in order from the variable-speed wind power generator having the highest priority order.

2. A power generating system according to claim 1, wherein the priority order is assigned to be higher for the variable-speed wind power generator installed in a location with more stable wind conditions.

3. A power generating system according to claim 1, wherein the priority order can be changed according to weather conditions.

* * * * *